Feb. 24, 1948.　　　H. N. BOYER　　　2,436,549
TRACTION DEVICE
Filed May 1, 1945
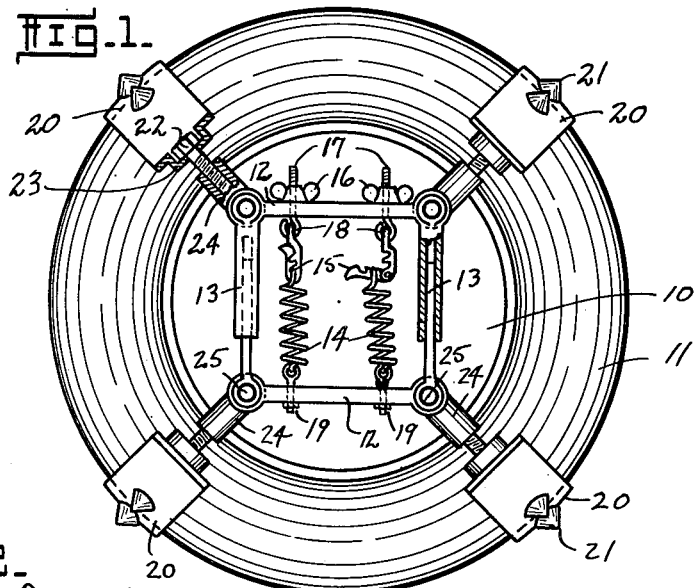
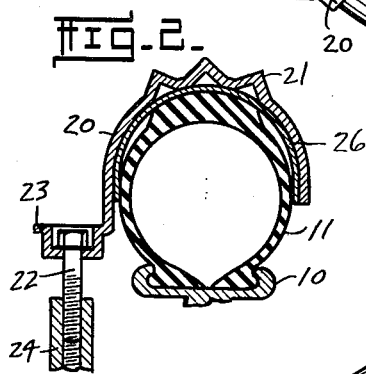
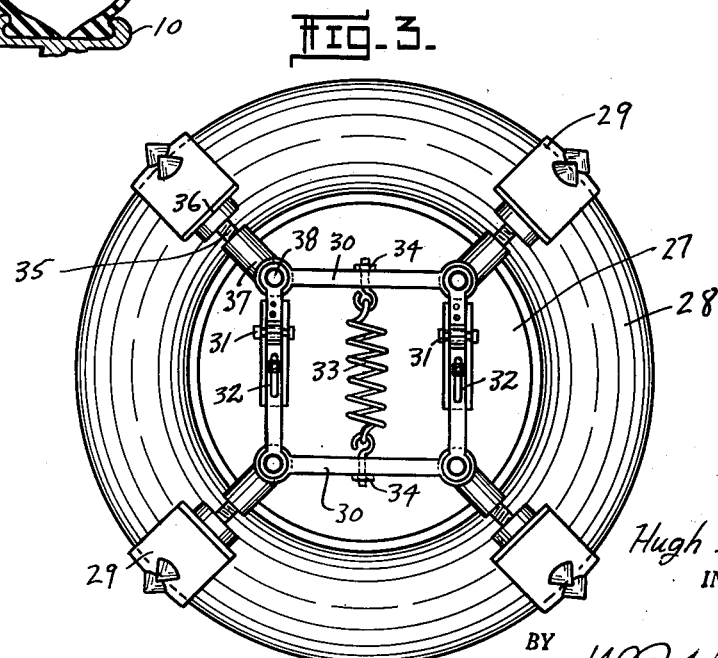
Hugh N. Boyer,
INVENTOR.
BY
W. B. Harpman
ATTORNEY.

Patented Feb. 24, 1948

2,436,549

UNITED STATES PATENT OFFICE 2,436,549

TRACTION DEVICE

Hugh N. Boyer, near Canfield, Ohio

Application May 1, 1945, Serial No. 591,252

2 Claims. (Cl. 152—225)

This invention relates to a traction device and more particularly to a device for installation on a conventional automotive wheel and tire assembly to provide additional means of traction therefor.

The principal object of the invention is the provision of a traction device assembly adapted for installation on an automotive wheel and tire assembly.

A further object of the invention is the provision of a traction device for an automotive wheel and tire assembly incorporating adjustable tensioning means for retaining the traction device in operative position.

A still further object of the invention is the provision of a traction device for an automotive wheel and tire assembly and incorporating hinge means enabling a portion of the device to be folded back with respect to another portion to facilitate installation of the traction device.

The traction device shown and described herein has been designed to provide a simple and effective means of establishing desirable traction with respect to an automotive wheel and tire assembly particularly as employed on passenger automobiles. It is well known that conventional automotive tire treads fail to provide sufficient traction at such times as they engage snow, ice and mud. It is also well known that it is common to employ tire chains to provide necessary traction to enable an automobile or other automotive vehicle to safely and surely negotiate icy roads or muddy roads. The principle disadvantage of conventional tire chains is the difficulty involved in installing the same and subsequently removing them from the automotive tire and wheel assembly. In addition to these disadvantages, it is well known that the cross link constructions used wear out rapidly and require frequent replacement. The present invention contemplates the provision of a traction device which may be simply and easily positioned on an automotive wheel and tire assembly on a motor vehicle at such time as it is needed and then removed therefrom by a simple and easy operation thereby eliminating the usual custom of applying tire chains and leaving them on for the duration of the adverse weather resulting in the snow and ice or mud conditions. The traction device shown and described herein is of simple formation and is so designed as to enable it to be readily mounted on an automotive wheel and tire assembly or removed therefrom.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein—

Figure 1 is a side elevation with parts in cross section of an automotive wheel and tire assembly illustrating the traction device installed therein, portions of the device being illustrated in cross section.

Figure 2 is an enlarged cross sectional detail of a portion of the device shown in Figure 1.

Figure 3 is a side elevation of an automotive wheel and tire assembly and illustrates a modified form of traction device in position thereon.

By referring to the drawings and Figures 1 and 2 in particular, it will be seen that an automotive wheel 10 is illustrated as being provided with a conventional pneumatic tire 11 and that a traction device has been positioned thereon, which traction device consists of a supporting frame 12 including telescopically engaging members 13. Tensioning springs 14 are detachably and adjustably affixed between the respective portions of the frame 12 on a plane parallel with the telescopically engaging members 13 thereof and normally tend to move the frame members 12 toward each other. The detachable mounting means of the springs 14 consist of quick, detachable link structures 15 and the adjustable supporting structures consist of manually adjustable nuts 16 engaging threaded shafts 17 which in turn are provided with eyelets 18 to which the quick, detachable link structures 15 are affixed. The opposite ends of the springs 14 are affixed to the other portion of the frame 12 by conventional means 19. The frame 12 thus provided automatically tensions a plurality of ground engaging traction shoes 20 which may obviously be formed with an irregular surface pattern such as indicated by the numerals 21 and which ground engaging traction shoes 20 are adjustably positioned with respect to the frame 12 by means of bolts 22, the heads of which engage appropriately shaped sections 23 of the traction shoes 20 and the threaded portions of which engage members 24 which in turn are pivoted as at 25 to the corners of the frame 12.

It will thus be seen that the traction device consists of a relatively few parts in simple assembly. It may be readily installed upon a conventional automotive wheel and tire assembly, such as indicated by the numerals 10 and 11 in Figures 1 and 2, by the simple expedient of opening the quick, detachable links 15 and moving the frame members 12 apart from one another to enable the traction shoes 20 to be positioned over the tire 11, as best illustrated in Figure 2. In such position the quick, detachable links 15 are closed and the nuts 16 adjusted to provide sufficient tension for the particular size of wheel and tire assembly the device is positioned upon. No further adjustment or attention is necessary as the traction shoes 20 are relatively loosely positioned on the bolts 22 and are thereby capable of movement sufficient to compensate for the flexing action of the tire 11 with respect to the ground engaging surface it engages.

By referring to Figure 2 in particular, it will be seen that the traction shoe 20 is preferably supplied with a rubber impregnated fabric back 26 suitably affixed to the traction shoe 20 so that it will in no way damage the tire 11.

By referring now to Figure 3 of the drawings, a modified form of the traction device illustrated in Figures 1 and 2 may be seen. In Figure 3 a conventional wheel and tire assembly are indicated by the numerals 27 and 28, respectively, and a traction device consisting of a plurality of traction shoes 29 affixed to a frame 30 are illustrated. The frame 30 is constructed differently from the frame 12, comparable structure as illustrated in Figure 1, in that it is preferably formed of channeled stock and in place of the telescopic members 13 of the frame 12, as illustrated in Figure 1, hinges 31 are provided as well as pin and slot constructions 32 between the respective halves of the frame 30 (the upper and the lower portions as illustrated in Figure 3). The pin and slot constructions 32 provide for the adjustable positioning of the frame 30 by permitting one-half thereof to be moved away from the other half so as to facilitate the installation of the device upon the wheel and tire assembly and the hinged constructions 31 enable the upper half of the frame 30 to be folded downwardly upon the lower half which construction facilitates the installation of the device particularly on an automobile wherein large wheel concealing fenders are employed. In installing the device upon an automobile, the device may be partly folded and a portion thereof inserted up underneath the fender until at least two of the traction shoes 29 have been hooked over the tire and the lower half of the frame folded downwardly and extended to the limit permitted by the pin and slot constructions 32 and the lower half installed. The frame 30 is spring tensioned by means of a spring 33 connected between the upper and lower portions of the frame 30 by conventional means 34 and each of the plurality of traction shoes 29 are affixed to the frame 30 by means of bolts 35, the heads of which engage members 36 on the traction shoes 29 and threadably engage pivot members 37 pivoted as at 38 to the corners of the frame 30.

The construction of the traction device, therefore, provides for the ready adaptability of the device to the particular desires of the purchaser. It will thus be seen that a simple and efficient traction device has been disclosed which may be easily mounted upon an automotive wheel and tire assembly and that when in position it will serve to maintain itself thereon and provide suitable traction between the tire and the ground surface over which the tire passes. It will also be observed that the traction device may be readily removed at such time as it is no longer needed.

Having thus described my invention, what I claim is:

1. A traction device for an automotive wheel and tire consisting of a two-part hinged frame movably assembled in telescopic engagement and having spring means normally urging the parts toward one another, a plurality of connecting members on said frame and traction shoes of U-shape adapted to overlie a tire, said traction shoes affixed to each of the said frame parts by said connecting members.

2. A traction device for an automotive wheel and tire comprising a pair of oppositely disposed U-shaped frame members hinged and slidably affixed to one another and having spring means normally urging the said frame members toward one another, connection means on said frame members and traction shoes adapted to overlie said tire loosely affixed to said connection means.

HUGH N. BOYER.

REFERENCES CITED

The following references are of record in the file of this patent:

UNITED STATES PATENTS

| Number | Name | Date |
| --- | --- | --- |
| 1,567,103 | Banes | Dec. 29, 1925 |
| 2,315,838 | Bryon | Apr. 6, 1943 |
| 1,540,470 | Hayden | June 2, 1925 |